(12) United States Patent
Funakoshi et al.

(10) Patent No.: US 12,191,745 B2
(45) Date of Patent: Jan. 7, 2025

(54) ROTARY ELECTRIC MACHINE

(71) Applicant: KABUSHIKI KAISHA YASKAWA DENKI, Kitakyushu (JP)

(72) Inventors: Kenji Funakoshi, Kitakyushu (JP); Takeru Hatanaka, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 478 days.

(21) Appl. No.: 17/725,483

(22) Filed: Apr. 20, 2022

(65) Prior Publication Data
US 2022/0385134 A1 Dec. 1, 2022

(30) Foreign Application Priority Data

May 28, 2021 (JP) ................................ 2021-090687

(51) Int. Cl.
*H02K 5/22* (2006.01)
*H01R 13/52* (2006.01)

(52) U.S. Cl.
CPC ......... *H02K 5/225* (2013.01); *H01R 13/5216* (2013.01)

(58) Field of Classification Search
CPC ............ H02K 5/225; H02K 5/26; H02K 5/22; H02K 5/1675; H02K 5/08; H02K 5/06; H02K 5/04; H02K 5/02; H01R 13/5216; H01R 13/516; H01R 13/46; H01R 13/50
See application file for complete search history.

(56) References Cited

U.S. PATENT DOCUMENTS

| 5,890,932 A | 4/1999 | Muta |
| 2011/0215658 A1* | 9/2011 | Tanabe ................. H01R 12/707 310/43 |
| 2014/0111037 A1 | 4/2014 | Funakoshi et al. |

(Continued)

FOREIGN PATENT DOCUMENTS

| CN | 209860731 U | 12/2019 |
| JP | H04-88356 U | 7/1992 |
| JP | H08-250176 | 9/1996 |

(Continued)

OTHER PUBLICATIONS

Japanese Office Action for corresponding JP Application No. 2021-090687, Aug. 1, 2022 (w/ English machine translation).

*Primary Examiner* — Nguyen Tran
(74) *Attorney, Agent, or Firm* — MORI & WARD, LLP

(57) ABSTRACT

A rotary electric machine includes a rotor rotatable around an axis, a stator provided to surround the rotor and having a first side on one side, a connecting board, a bracket, connection pins electrically connected to the connecting board, a direct connection connector, and a main circuit connector. Stator windings are electrically connected the connecting board which is provided on the one side. The bracket has an opening and is provided on the one side to be connected to the stator so as to cover the connecting board and the first side of the stator. The direct connection connector is inserted into the opening such that the connection pins are inserted into the direct connection connector to be electrically connected to the direct connection connector. The main circuit connector is inserted into the opening and to be electrically connected to the direct connection connector.

17 Claims, 15 Drawing Sheets

(56) References Cited

U.S. PATENT DOCUMENTS

2018/0083507 A1* 3/2018 Tokizaki ............... H02K 3/50
2020/0251951 A1* 8/2020 Kinjo .................. H02K 7/003

FOREIGN PATENT DOCUMENTS

| | | |
|---|---|---|
| JP | 2010-233436 | 10/2010 |
| JP | 2014-087085 | 5/2014 |
| JP | 6137901 B2 | 10/2014 |
| JP | 2017-147886 | 8/2017 |

* cited by examiner

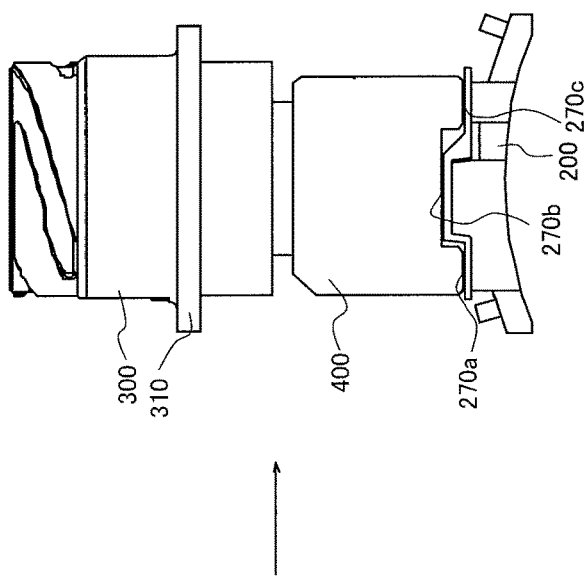
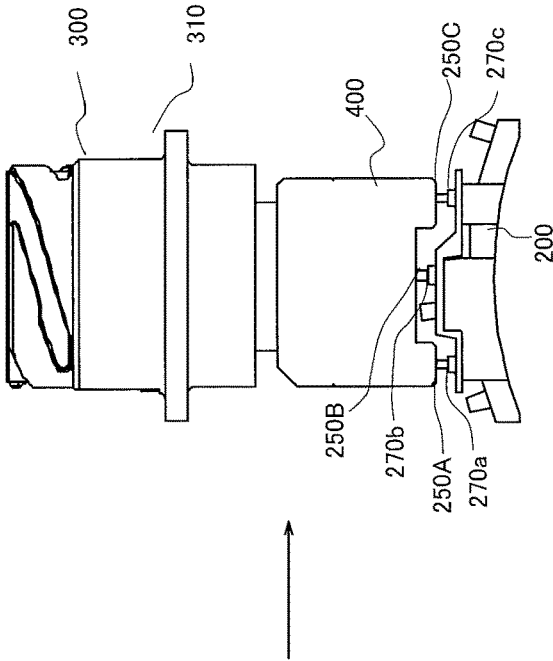
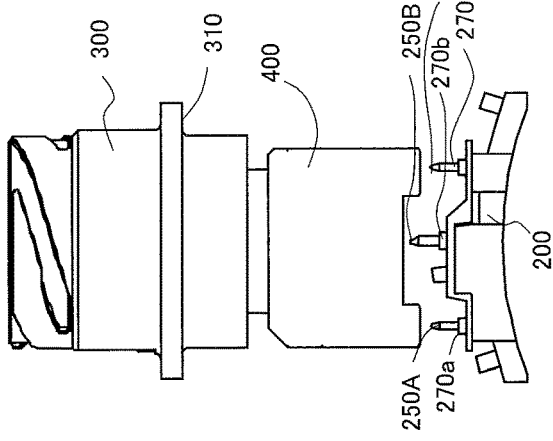

ROTARY ELECTRIC MACHINE

The present application claims priority under 35 U.S.C. § 119 to Japanese Patent Application No. 2021-090687, filed May 28, 2021. The contents of this application are incorporated herein by reference in their entirety.

BACKGROUND OF THE INVENTION

Field of the Invention

The disclosed embodiment relates to a rotary electric machine.

Discussion of the Background

Japanese Patent Application Laid-Open No. 2010-233436 shows a motor in which a connecting plate and a receptacle provided outside the frame are connected by a lead wire.

SUMMARY OF THE INVENTION

According to one aspect of the present invention, a rotary electric machine includes a rotor rotatable around an axis, a stator provided to surround the rotor around the axis and including stator windings, a connecting board, a bracket, connection pins electrically connected to the connecting board, a direct connection connector, and a main circuit connector. The stator has a first side on one side and a second side opposite to the first side along the axis. The connecting board is provided on the one side. The stator windings are electrically connected the connecting board. The bracket has an opening and is provided on the one side to be connected to the stator so as to cover the connecting board and the first side of the stator. The direct connection connector is inserted into the opening of the bracket such that the connection pins are inserted into the direct connection connector to be electrically connected to the direct connection connector. The main circuit connector is inserted into the opening to be engaged with the bracket and to be electrically connected to the direct connection connector.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIGS. 12A, 12B, and 12C are diagrams showing the behavior of the connection pin of the connection terminal accommodated in the direct connection connector when the main circuit connector is attached to the opening, as viewed from the anti-load side.

DESCRIPTION OF THE EMBODIMENTS

Hereinafter, an embodiment will be described with reference to the drawings. It should be noted that detailed description of portions not related to the essence of the disclosed embodiment will be omitted as appropriate.

<Overall Configuration of Rotary Electric Machine>

Figure 1:
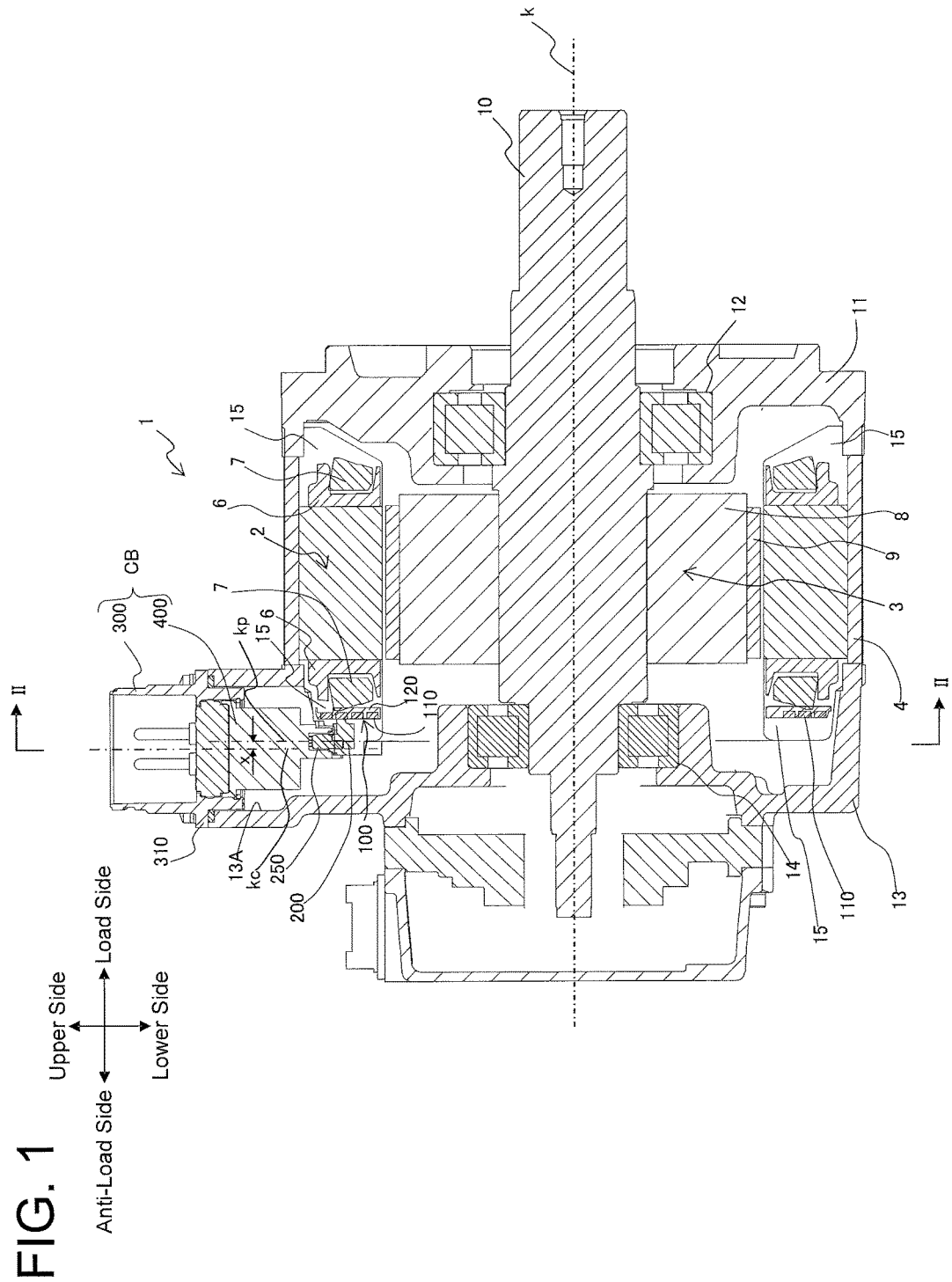
FIG. 1 is a vertical cross-sectional view showing the overall configuration of the rotary electric machine according to the embodiment.
Figure 2:
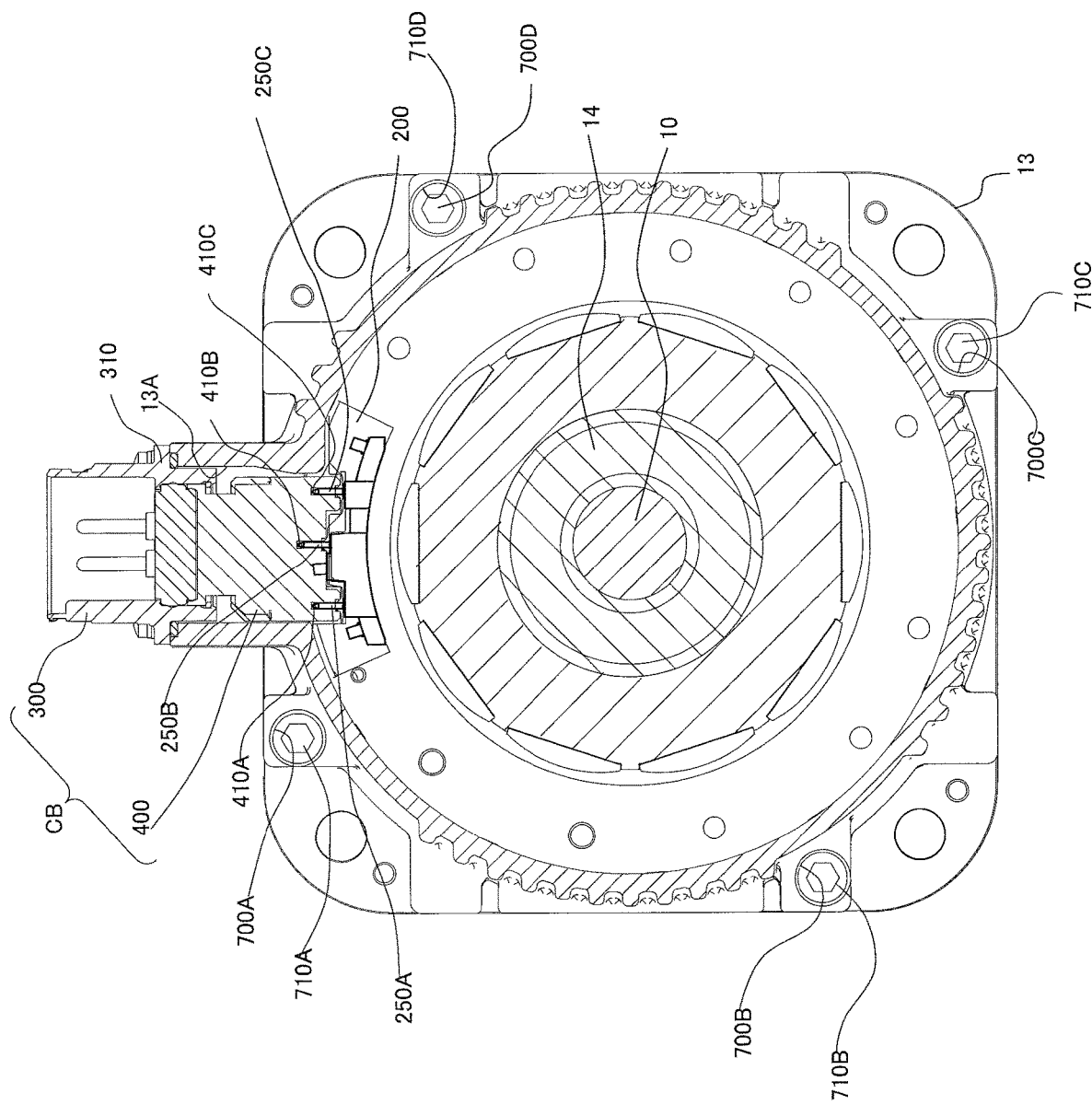
FIG. 2 is a cross-sectional view taken along the line II-II in FIG. 1.
Figure 3:
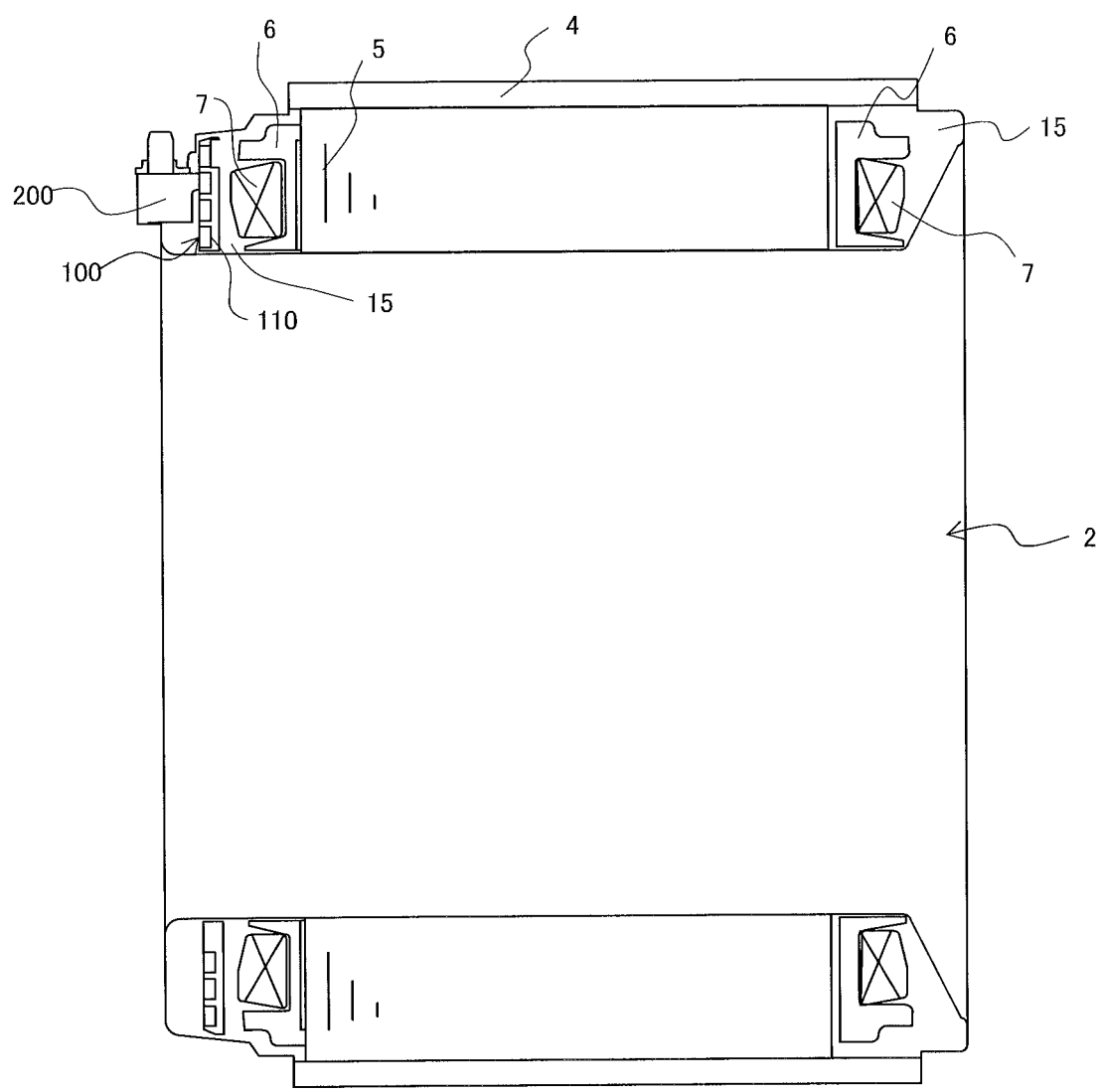
FIG. 3 is a schematic cross-sectional view showing a stator and a frame, which are integrated by resin molding, as shown in FIG. 1.
Figure 4A:
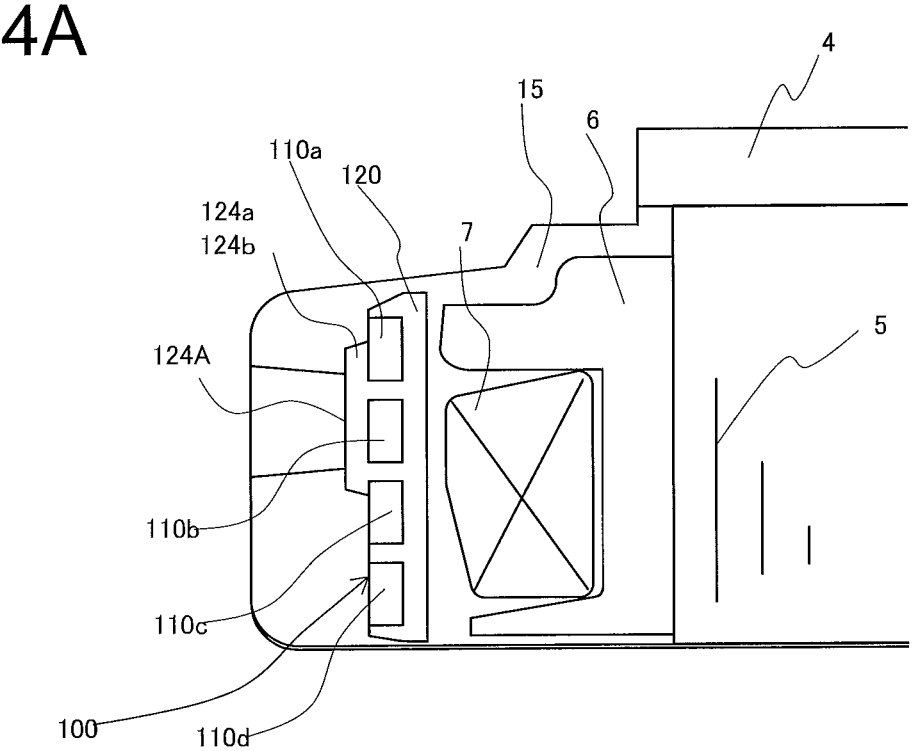
FIGS. 4A and 4B are enlarged cross-sectional views of the main part of FIG. 3.
Figure 4B:
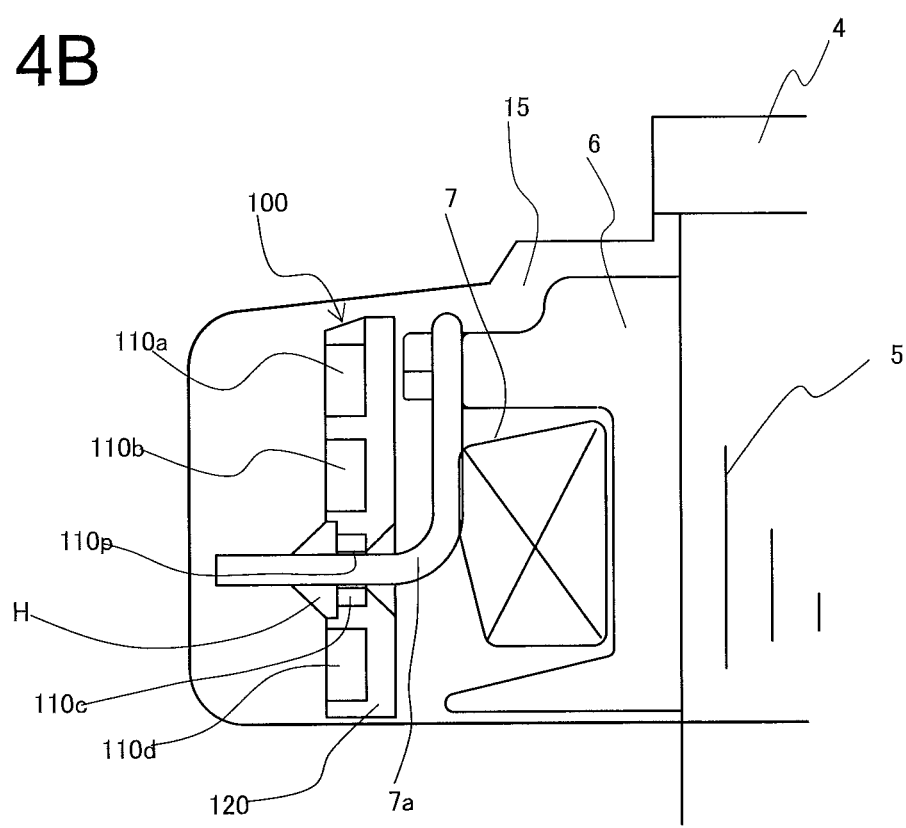

Referring to FIGS. 1, 2, 3, 4A, 4B, the entire configuration of the rotary electric machine 1 according to the present embodiment will be described. In the following description, "upper side", "lower side", "load side" and "anti-load side" correspond to the arrow directions shown in FIG. 1. In FIGS. 1 and 2, in this example, the rotary electric machine 1 is a three phase AC electric motor. That is, the rotary electric machine 1 includes a stator 2, a rotor 3, and a frame 4 extending in the axial direction. The rotor 3 is fixed to an outer peripheral surface of a rotary shaft 10 having an axial center k.

The stator 2 is provided on the inner peripheral surface of the frame 4. The stator 2 has a plurality of laminated core bodies 5 (see FIGS. 3 and 4A, 4B), a plurality of bobbins 6 through which the laminated core bodies 5 are inserted, and a plurality of stator windings 7 wound around the bobbins 6. An anti-load side bracket 13 (an example of a bracket) is fixed to the anti-load side of the frame 4 (one side in the axial direction, left side in FIGS. 1, 3, 4A, 4B), and a load side bracket 11 is fixed to the load side of the frame (the right side in FIGS. 1, 3, 4A, 4B).

Each bobbin 6 is made of an insulating material such as a resin to electrically insulate the laminated core bodies 5 from the stator winding 7. An annular connecting board 100 (an example of a connecting board) is provided on the anti-load side of the bobbin 6. The connecting board 100 includes end portions 7a of a plurality of stator windings 7 (hereinafter referred to simply as "winding end portions 7a", see FIG. 4B), a wiring process is performed in a predetermined wiring pattern. The winding end portion 7a is fixed to the connecting board 100 by solder H (see also FIG. 5 described later). The entire stator 2 including the stator winding 7 and the connecting board 100 are integrally covered by a resin molding portion 15 (hatching is omitted to avoid the complication shown in the drawings) and fixed to the frame 4 by the resin molding portion 15.

The rotor 3 is provided so as to face the inside in the radial direction of the stator 2, and has a yoke 8 and a permanent magnet 9. The rotary shaft 10 is rotatably supported by a load-side bearing 12 having an outer ring fitted to a load-side bracket 11 and an anti-load side bearing 14 having an outer ring fitted to an anti-load-side bracket 13.

<Connecting Board>

Figure 5:
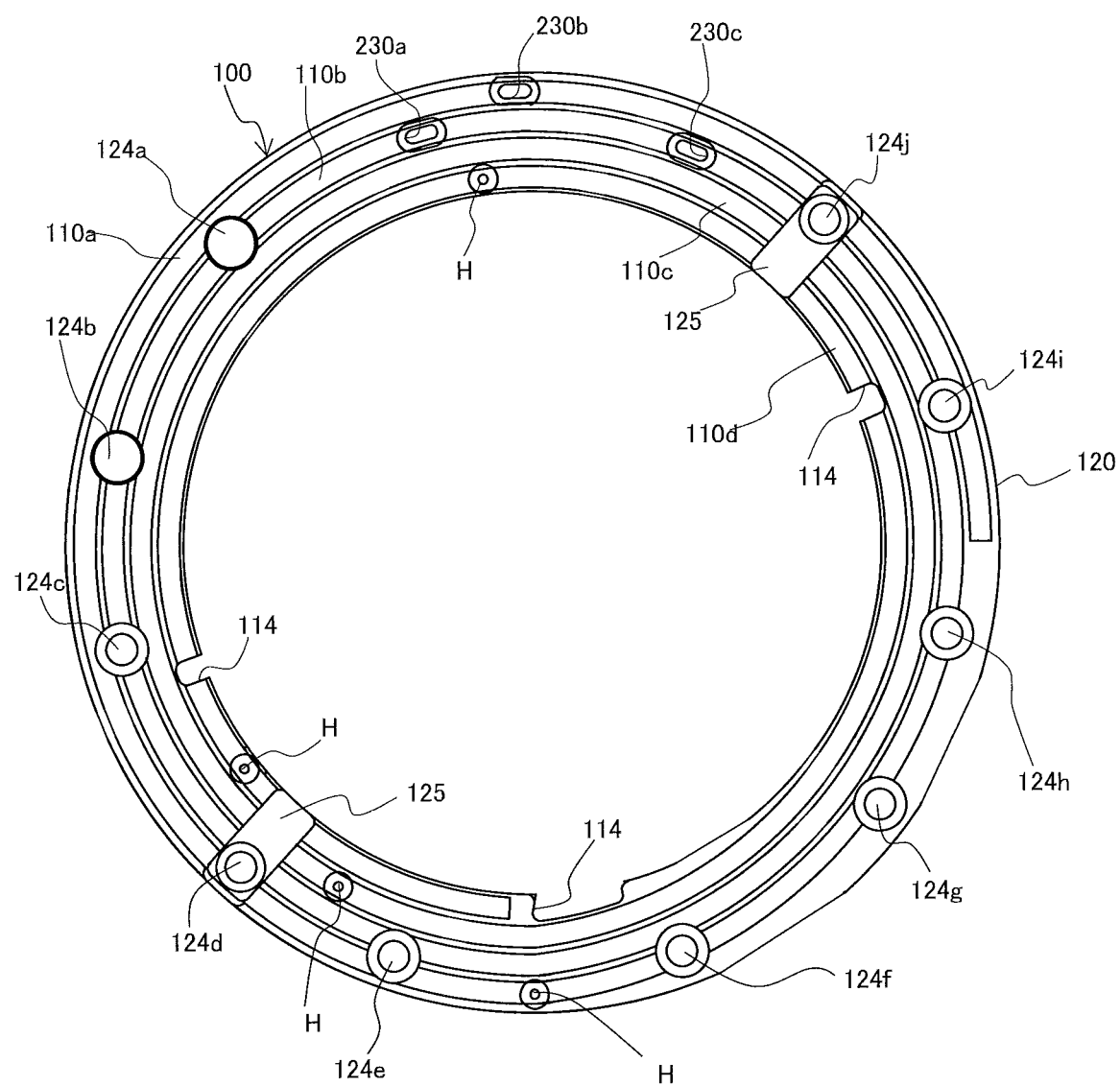
FIG. 5 is a diagram showing a detailed structure of connecting board viewed from the anti-load side.

As shown in FIG. 5, the connecting board 100 has a plurality of arc-shaped (or annular) conductive members 110a to 110d (four in this example) arranged concentrically and connected to the winding end portion of the stator 2, and a substantially annular insulating member 120 covering at least a part of the surface of the conductive members 110a to 110d.

<Conductive Member>

In FIG. 5, the conductive members 110a to 110d are arranged substantially concentrically so as to have four layers in the radial direction, and the conductive member 110a, the conductive member 110b, the conductive member 110c and the conductive member 111d are arranged in this order from the radially outer side toward the radially inner side. Hereinafter, these conductive members 110a to 110d are collectively referred to simply as "conductive members 110".

The outermost conductive member 110a is provided with a support hole 230b into which a support leg 200b of a connection terminal 200 to be described later is inserted and attached, and the second conductive member 110b from the outer side is provided with support holes 230a and 230c into which support leg 200a and 200c of a connection terminal 200 to be described later is inserted and attached.

In this example, each conductive member 110 is formed, for example, by forming a single wire, i.e., a covered rectangular wire, into a spiral shape, and then cutting off a predetermined portion to form a defect (see an end portion 114 formed by the defect). At this time, a through hole 110p (see FIG. 4B) for penetrating the winding end portion 7a in the direction of the rotational axis is provided at a substantially central position in the width direction at both ends in the longitudinal direction of each conductive member 110. The winding end portion 7a penetrating through the through hole 110p is fixed to the surface of the conductive member 110 on the anti-load side by solder H.

<Insulating Member>

The insulating member 120 is an annular member formed by insert molding using a resin material, for example. The insulating member 120 secures insulation between the conductive members 110 while fixing each conductive member 110 at a predetermined position so as to be on the same plane substantially perpendicular to the rotational axis direction.

The insulating member 120 is provided with resin fixing protruding portions 124a to 124j protruding from the resin molding portion 15 on one side (anti-load side) in the axial direction at a plurality of locations (10 locations in this example) in the circumferential direction. Hereinafter, the protruding portions 124a to 124j are collectively referred to simply as "protrusions 124". At least one of the among the plurality of protruding portions 124 is integrally provided with a binding portion 125. The binding portion 125 is provided in the radial direction from the inner peripheral side to the outer peripheral side of the insulating member 120 so as to bind a plurality of conductive members 110 arranged in the radial direction. The insulating member 120 covers the surface of the conductive member 110 on the anti-load side at the protruding portion 124 and the binding portion 125, while the surface of the conductive member 110 on the anti-load side is exposed at portions other than the protruding portion 124 and the binding portion 125.

In this example, eight of the protruding portions 124c to 124j, except for the protruding portions 124a and 124b among the protruding portions 124a to 124j, have a substantially conical shape having a flat surface at the top thereof so as to be substantially isosceles trapezoid in a side view. Most of the protruding portions 124c to 124j are covered by the resin molding portion 15. The flat surfaces of the top portions of the protruding portions 124c to 124j are exposed. The protruding portions 124a and 124b have a flat circular plate shape different from the protruding portions 124c to 124j. The end portion 124A on the anti-load side of the protruding portions 124a and 124b is not covered with the resin molding portion 15 and is exposed from the resin molding portion 15 (see FIG. 4A).

<Connection Terminal>

Referring back to FIGS. 1, 2 and 3, a connection terminal 200 is attached to an end portion of the connecting board 100 on the anti-load side. A plurality of connection pins 250A to 200 c (three in this example) which are electrically connected to the connection terminal 200 are provided outward in the radial direction from the connection terminal. It should be noted that the connection pins 250A to 250 c are hereinafter collectively referred to simply as "connection pins 250".

Figure 6:
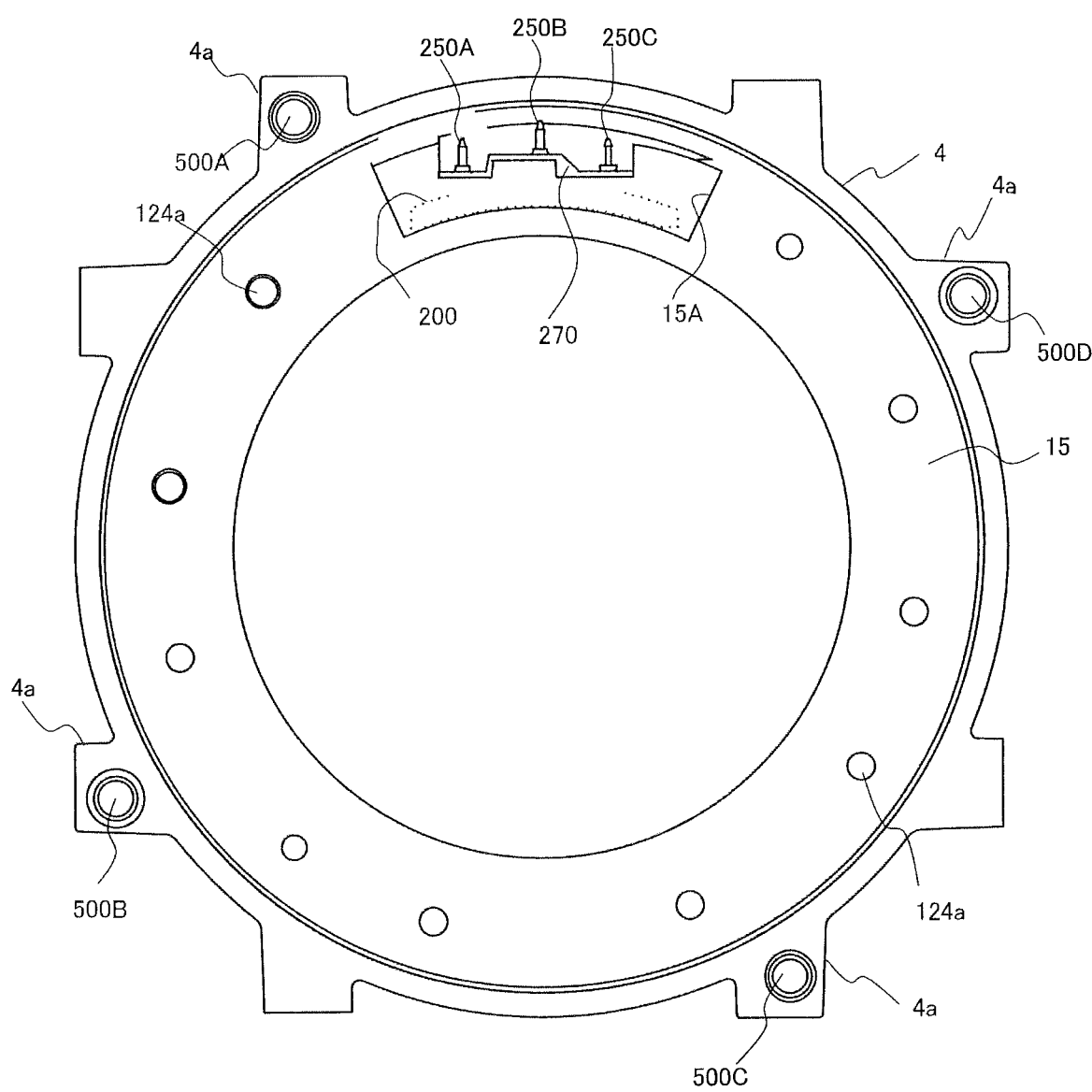
FIG. 6 is a view showing a detailed structure of a connecting board fixed to a frame by resin molding, a connection terminal and a connection pin fixed to the connecting board as viewed from the anti-load side.
Figure 7:
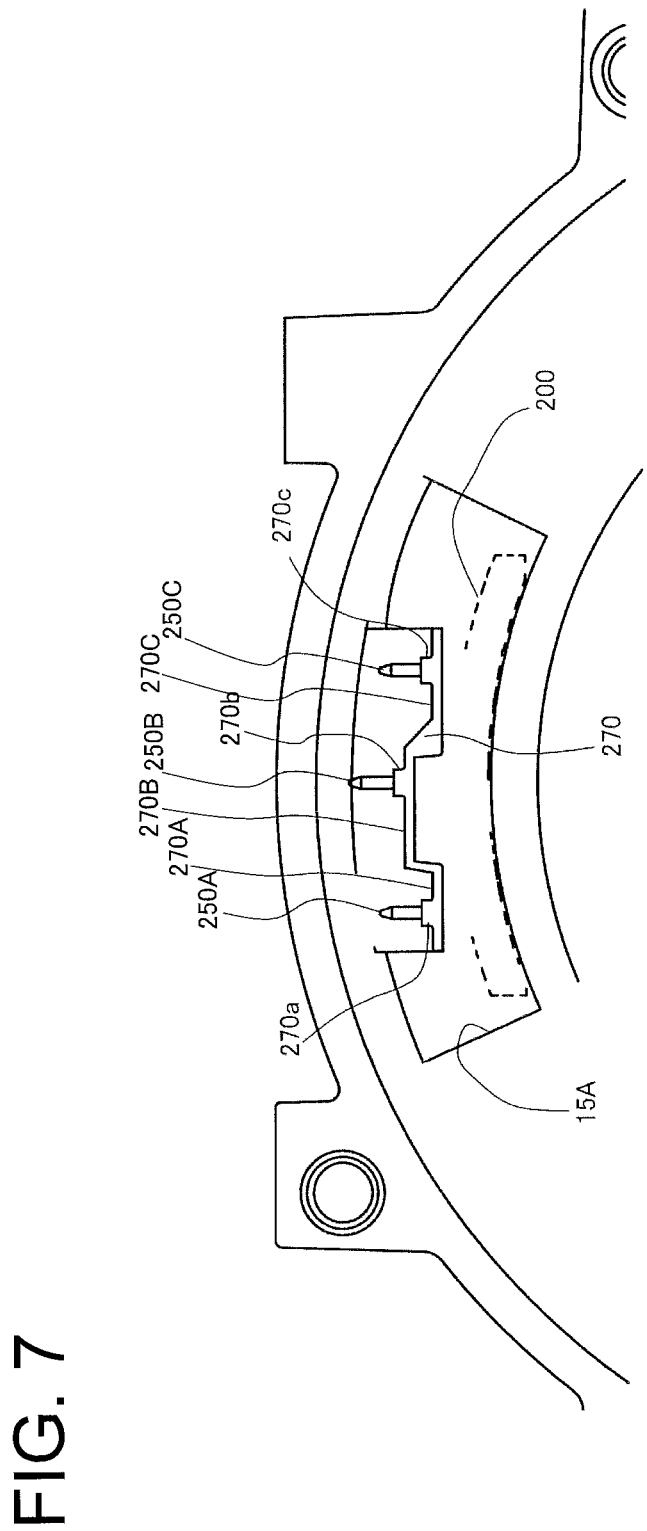
FIG. 7 is an enlarged view of the main part.

More specifically, as shown in FIGS. 6 and 7, a plurality of (three in this example) support legs 200a, 250B, and 250C (see FIG. 9 to be described later) provided on the load side of the connection terminal 200 corresponding to the connection pins 200a, 200b, and 250C are inserted into the support holes 230a, 230b, and 230c of the conductive member 110 of the connecting board 100 and are fixed by solder (not shown). At this time, as described above, an opening 15A is provided at a portion corresponding to the connection terminal 200 of the resin molding portion 15 covering the connecting board 100. The connection terminal 200 is provided such that at least the connection pin 250 is exposed from the opening 15A of the resin molding portion 15 to the anti-load side together with the elastic member 270 described later.

<Connection Terminal and Connection Pin>

Figure 8:
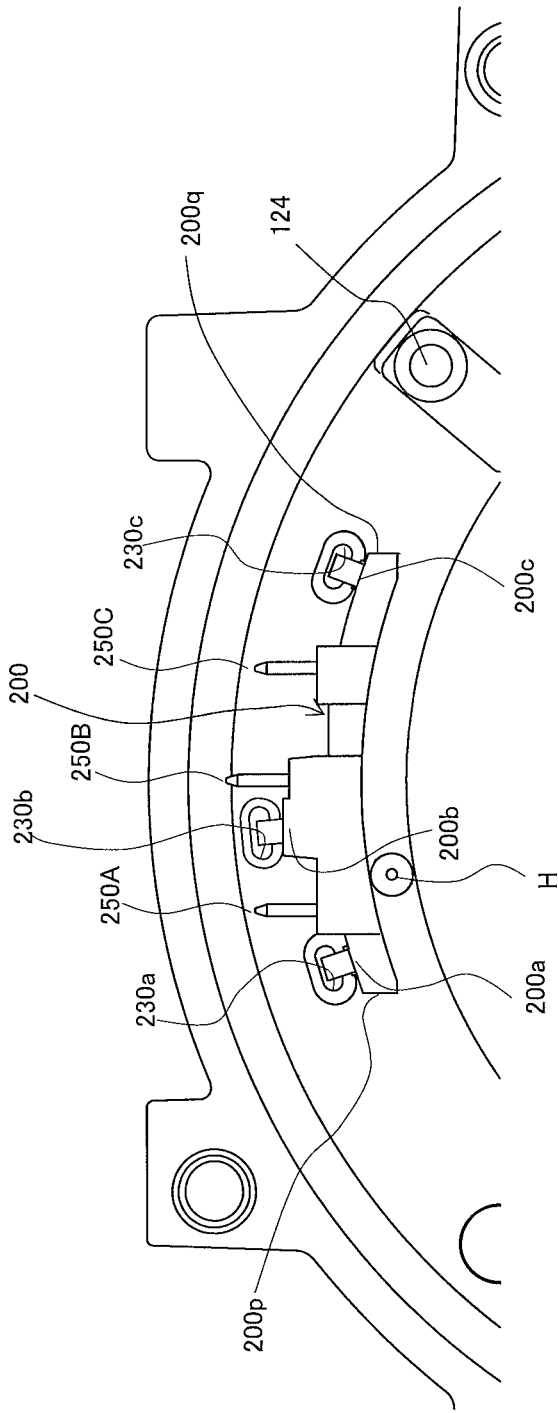
FIG. 8 is resin mold that is omitted from the structure shown in FIG. 7.

As shown in FIGS. 8 and 9, the connection terminal 200 has a base portion 200d having a substantially circular arc shape along the conductive member 110 of the connecting board 100 described above, and a plurality of (three in this example) step portions 200A, 200B, and 200C forming an concave and convex shape protruding above the base portion 200d (in other words, radially outward). In the illustrated example, the step portion 200B located at the center in the drawing has the largest protruding dimension LB upward from the inner edge of the base portion 200d, and the protruding dimension LA of the step portion 200A located at the left side in the drawing and the protruding dimension LC of the step portion 200C located at the right side in the drawing are smaller than the protruding dimension LB of the step portion 200B. As a result, the step portions 200A to 200C form the above-described concave and convex shape in which the center in the circumferential direction is convex and both sides thereof are concave so as to face the connector 400 for direct connection described later.

The connection pins 250A to 250C are provided in the step portions 200A to 200C which are different from each other. More specifically, the connection pin 250A is provided at the step portion 200A, the connection pin 250B is provided at the step portion 200B, and the connection pin 250C is provided at the step portion 200C. As a result, the tip end position of the connection pin 250B located at the center in the figure is located at the uppermost side, and the tip end positions of the connection pin 250A located at the left side in the figure and the connection pin 250C located at the right side in the figure are located below the tip end position of the connection pin 250B.

Figure 9A:
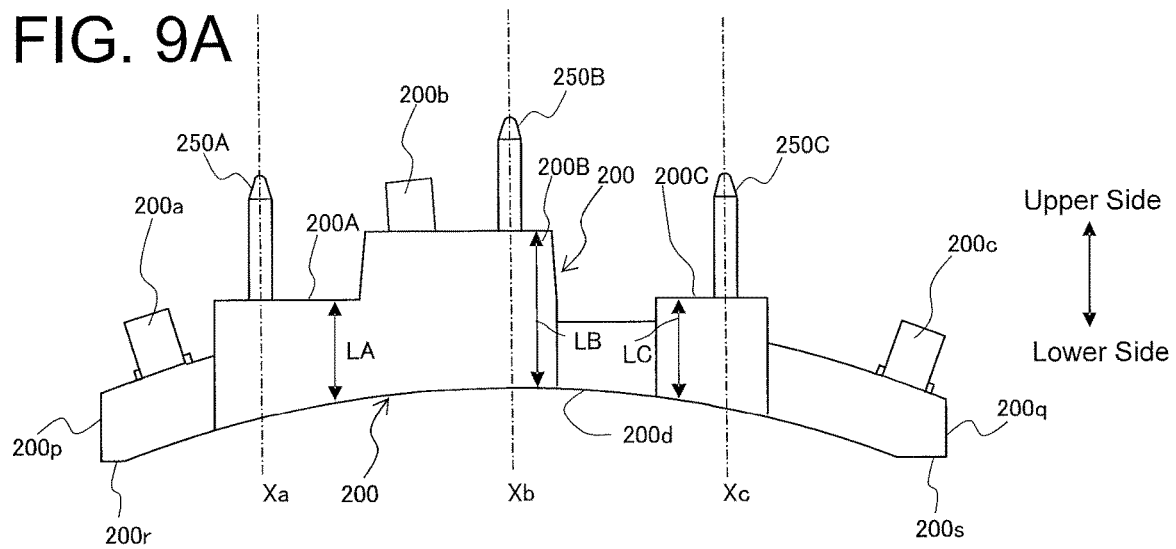
FIGS. 9A and 9B are top views showing a detailed structure of the connection terminal as viewed from the anti-load side.
Figure 9B:
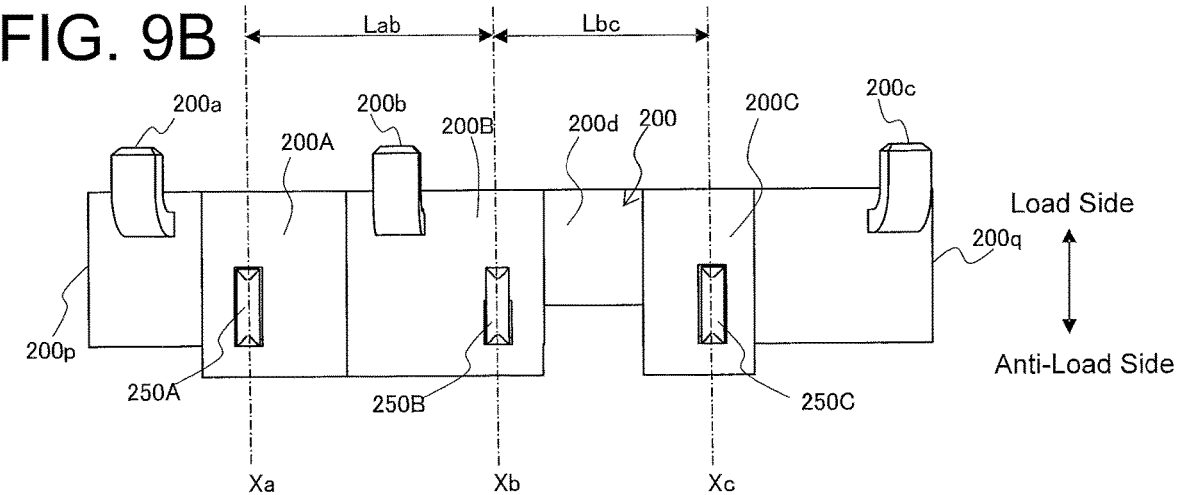
Figure 10A:
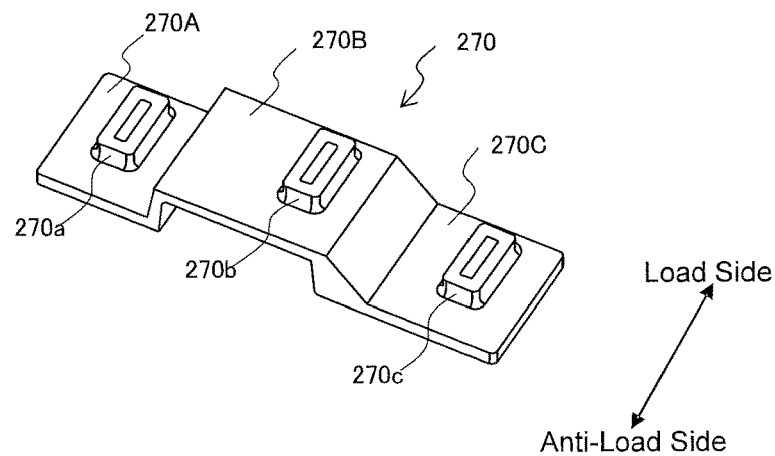
FIGS. 10A, 10B, 10C and 10D are external perspective views, top views, views from the anti-load side, and longitudinal sectional views from the anti-load side showing the detailed structure of the elastic member.
Figure 10B:
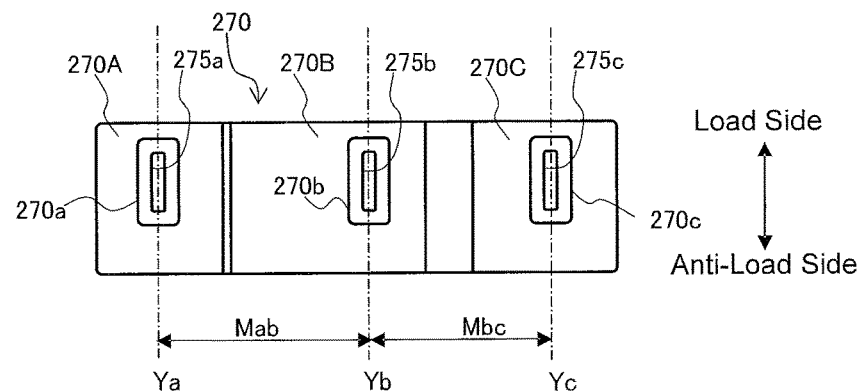
Figure 10C:
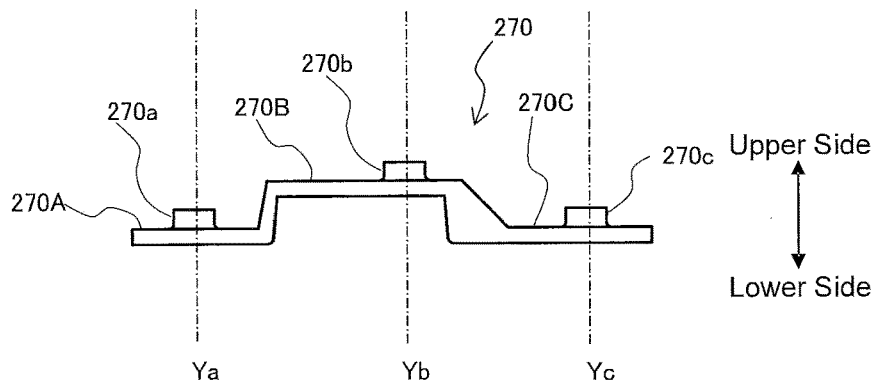
Figure 10D:
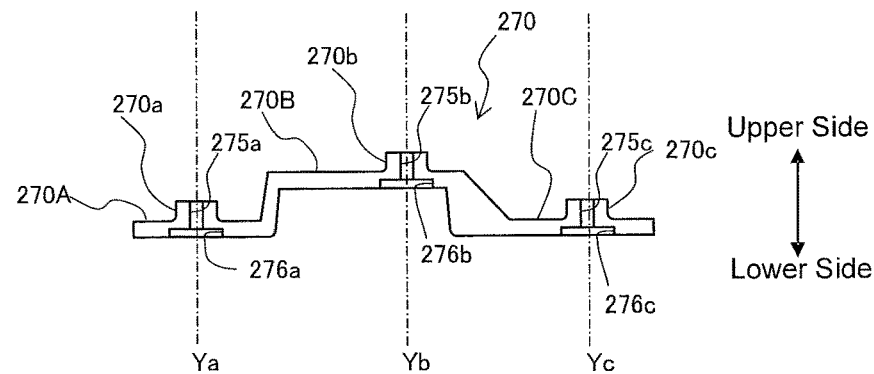

Further, an installation region of the three connection pins 250A, 250B, 250C in the connection terminal 200 is configured to be an asymmetrical shape between one side of the center plane and the other side thereof with respect to the center plane in the circumferential direction. For example, in the example shown in FIG. 9, the center surface in the circumferential direction of the connection terminal 200 is a surface Xb in the radial direction passing through the center of the connection pin 250B (hereinafter referred to as a "center surface of the connection pin 250B"). The same shall apply hereinafter.) As shown in FIGS. 9A and 9B, in this example, the concave and convex shapes formed by the step portions 200A, 200B and 200C are different from each other on one side in the circumferential direction (left side in the drawing) and on the other side in the circumferential direction (right side in the drawing) of the center plane Xb of the connection pin 250B, in other words, they are asymmetrical with respect to the center surface of the connection pin 250B.

Further, in this example, the distance Lab between the center plane Xa of the connection pin 250A and the center plane Xb of the connection pin 250B and the distance Lbc between the center plane Xb of the connection pin 250B and the center plane Xc of the connection pin 250C are different from each other. That is, the installation positions of the connection pins 250A to 250C in the connection terminals 200 are configured to be asymmetric with respect to the center plane Xb of the connection pin 250B, which is the center plane in the circumferential direction, between the installation position of the connection pin 250A on one side (left side in the drawing) of the center plane Xb and the installation position of the connection pin 250C on the other side (right side in the drawing).

At both ends of the base portion 200d of the connection terminal 200 in the circumferential direction, positioning end surfaces 200p and 200q for positioning, which will be described later, are provided in the vertical direction and the axial direction, and positioning end surfaces 200r and 200s are provided in the horizontal direction perpendicular to the vertical direction and along the axial direction. These positioning end surfaces 200p, 200q, 200r and 200s will be described later.

<Elastic Member>

An elastic member 270 formed in a substantially sheet shape by, for example, rubber or the like is provided over the connection terminal 200 having the above-described shape so as to cover it. As shown in FIGS. 10A to 10D, the elastic member 270 includes a plurality of (three in this example) step portions 270A, 270B, and 270C corresponding to the plurality of (three in the example described above) step portions 200A, 200B, and 200C of the connection terminal 200 described above. The step portions 270A, 270B, and 270C have a lower shape substantially following the upper shape of the step portions 200A, 200B, and 200C of the connection terminals 200 described above, and as a result, the elastic member 270 as a whole has an concave and convex shape in which the center in the circumferential direction protrudes upward from both sides thereof, similar to the connection terminals 200 described above.

The step portion 270A is provided with a through hole 275a through which the corresponding connection pin 250A passes, and a protruding portion 270a provided corresponding to the through hole 275a. The protruding portion 270a is provided on the outer peripheral side of the through hole 275a so as to protrude radially outward (in other words, upward) of the connecting board 100 (see FIG. 7).

Similarly, the step portion 270B is provided with a through hole 275b penetrating the corresponding connection pin 250B and a protruding portion 270B provided corresponding to the through hole 275b. The protruding portion 270b is provided on the outer peripheral side of the through hole 275b so as to protrude outward in the radial direction of the connecting board 100.

Similarly, the step portion 270C includes a through hole 275c penetrating the corresponding connection pin 250C, and a protruding portion 270C provided corresponding to the through hole 275c. The protrusion 270c is provided on the outer peripheral side of the through hole 275c so as to protrude outward in the radial direction of the connecting board 100.

In each of the step portions 270A, 270B and 270C, openings 276a, 276b and 276c having a large diameter communicating with the through holes 275a, 275b and 275c are provided below the through holes 275a, 275b and 275c, respectively.

The above-described concave and convex shapes formed by the step portions 270A, 270B and 270C are different from each other on one side in the circumferential direction (left side in the drawing) and on the other side in the circumferential direction (right side in the drawing) of the center plane Yb which passes through the center axis of the through hole 275b of the step portion 270B corresponding to the connection pin 250B and faces in the radial direction of the connecting board 100, that is, asymmetric with respect to the center plane Yb. At this time, the distance Mab between the center plane Ya passing through the center axis of the through hole 250A of the step portion 250A corresponding to the connection pin 270A and the center plane Yb, and the distance Mbc between the center plane Yc passing through the center axis of the through hole 275c of the step portion 270C corresponding to the connection pin 250C and the center plane Yb are different in size from each other. That is, the through holes 275a, 275b and 275c are configured so that their positions are asymmetric with respect to the center plane Yb between the position of the through hole 275a on one side (left side in the drawing) of the center plane Yb and the position of the through hole 275c on the other side (right side in the drawing).

<Connector Body>

In this embodiment, as shown in FIG. 1, an opening 13A is provided in the anti-load side bracket 13 so as to face outward in the radial direction. When the connector body CB (see FIG. 11 to be described later) is attached to the opening 13A, the internal equipment of the rotary electric machine 1 is connected to the main circuit outside the rotary electric machine 1, and the electric current and signal are supplied and received between them.

Figure 11:
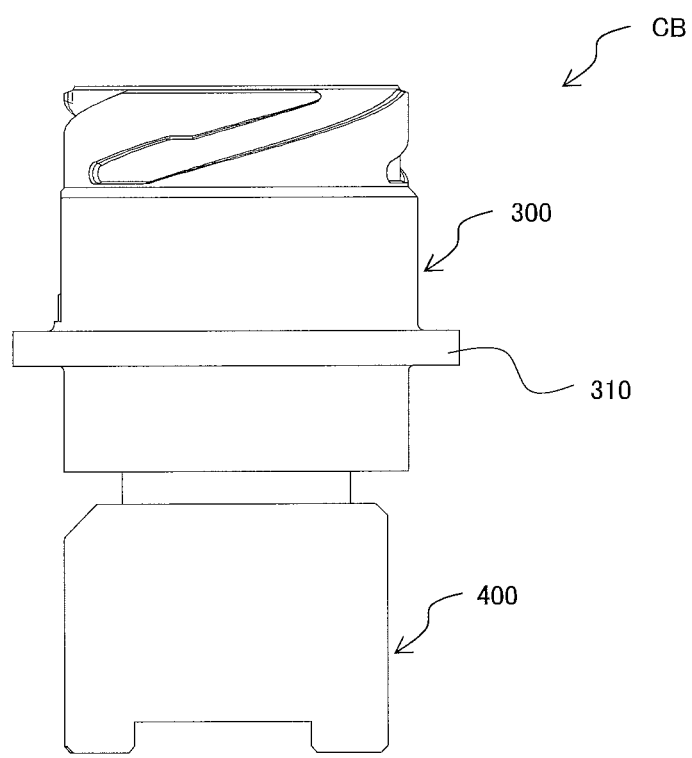
FIG. 11 is a side view showing an external structure of a connector body.

As shown in FIG. 11, the connector body CB includes a main circuit connector 300 and a direct connection connector 400 provided in electrical communication with the main circuit connector 300, and the main circuit connector 300 and the direct connection connector 400 are integrally formed detachably.

As shown in FIGS. 1 and 2, the main circuit connector 300 is engaged with the opening 13A by inserting a lower portion thereof into the opening 13A and abutting the flange portion 310 against the upper edge of the opening 13A.

As shown in FIG. 2, the direct connection connector 400 has storage holes 410A, 410B, and 410C corresponding to the connection pins 250A, 250B, and 250C provided at the connection terminal 200. The direct connection connector 400 is inserted into the opening 13A when the main circuit connector 300 is engaged with the opening 13A in the behavior shown in FIGS. 12A to 12C (see FIGS. 1 and 2). At this time, as shown in FIG. 1, the axial position of the radial center line kc of the direct connection connector 400 (in other words, the radial center line of the connector body CB) and the axial position of the radial center line kp of each of the connection pins 250A to C are offset from each other by a distance x along the axial direction (lateral direction in FIG. 1). Although detailed illustration and description are omitted, the connection pins 250A, 250B, and 250C of the connection terminal 200 attached to the connecting board 100 as described above are inserted into the storage holes 410A, 410B, and 410C of the direct connection connector 400 and stored therein. Each of the storage holes 410A, 410B and 410C is provided with a conductive metal fitting (not shown) capable of conducting with the main circuit connector 300 via an internal wiring in the direct connection connector 400, and these conductive metal fittings conduct with the connection pins 250A, 250B and 250C at the time of storage.

When the direct connection connector 400 is electrically connected to the connection pins 250A, 250B, and 250C according to the behaviors shown in FIGS. 12A to 12C, the above-described elastic member 270 is sandwiched and pressed between the direct connection connector 400 and the connection terminal 200 as shown in FIGS. 12A to 12C. At this time, the protruding portions 270a, 270b, and 270c of the elastic member 270 are compressed between the direct connection connector 400 and the connection terminal 200 and deformed so as to push and spread (see FIG. 12C).

<Positioning During Resin Molding>

In the rotary electric machine 1 of the present embodiment, as described above, the connection pin 250 and the connection terminal 200 which are electrically connected to the direct connection connector 400 of the connector body CB are attached to the connecting board 100. On the other hand, the connecting board 100 is fixed to the frame 4 by the resin molding portion 15 together with the stator 2. Therefore, for accurate conduction between the connection pin 250 and the direct connection connector 400, it is important to position the connecting board 100 with high accuracy when resin molding is performed.

<Frame Positioning Reference Hole>

In the present embodiment, the frame 4 is provided with a reference hole serving as a reference for positioning all parts by the method described below. That is, as shown in FIG. 6, the frame 4 is provided with thick bosses 4a at four locations on the radial outer peripheral portion thereof, and reference holes 500A, 500B, 500C and 500D are formed in the axial direction in each boss 4a. Hereinafter, these reference holes 500A to 500D are collectively referred to simply as "reference holes 500". The reference holes 500 are machined with a sufficiently high accuracy by any known technique such as reaming.

<Positioning of Connection Terminal on Connecting Board>

In this embodiment, prior to the resin molding, the connecting board 100 is positioned with respect to the frame 4 using the reference holes 500 of the frame 4, and then the connection terminal 200 is positioned and attached with respect to the connecting board 100. A positioning jig 600 shown in FIGS. 13 and 14 is used for the attachment.

The jig 600 has a substantially flat main body section 601, a thick section 611 provided on one side (the upper side in FIG. 13) of the main body section 601, a thick section 612 provided on the other side (the lower side in FIG. 13) of the main body section 601, a through hole 621 formed in the thick section 611 in a direction perpendicular to the surface direction of the main body section 601, a through hole 622 formed in the thick section 612 in a direction perpendicular to the surface direction of the main body section 601, and through holes 631, 632, 633 formed in the main body section 601 from a region near the thick section 612 to the thick section 612.

Figure 14:
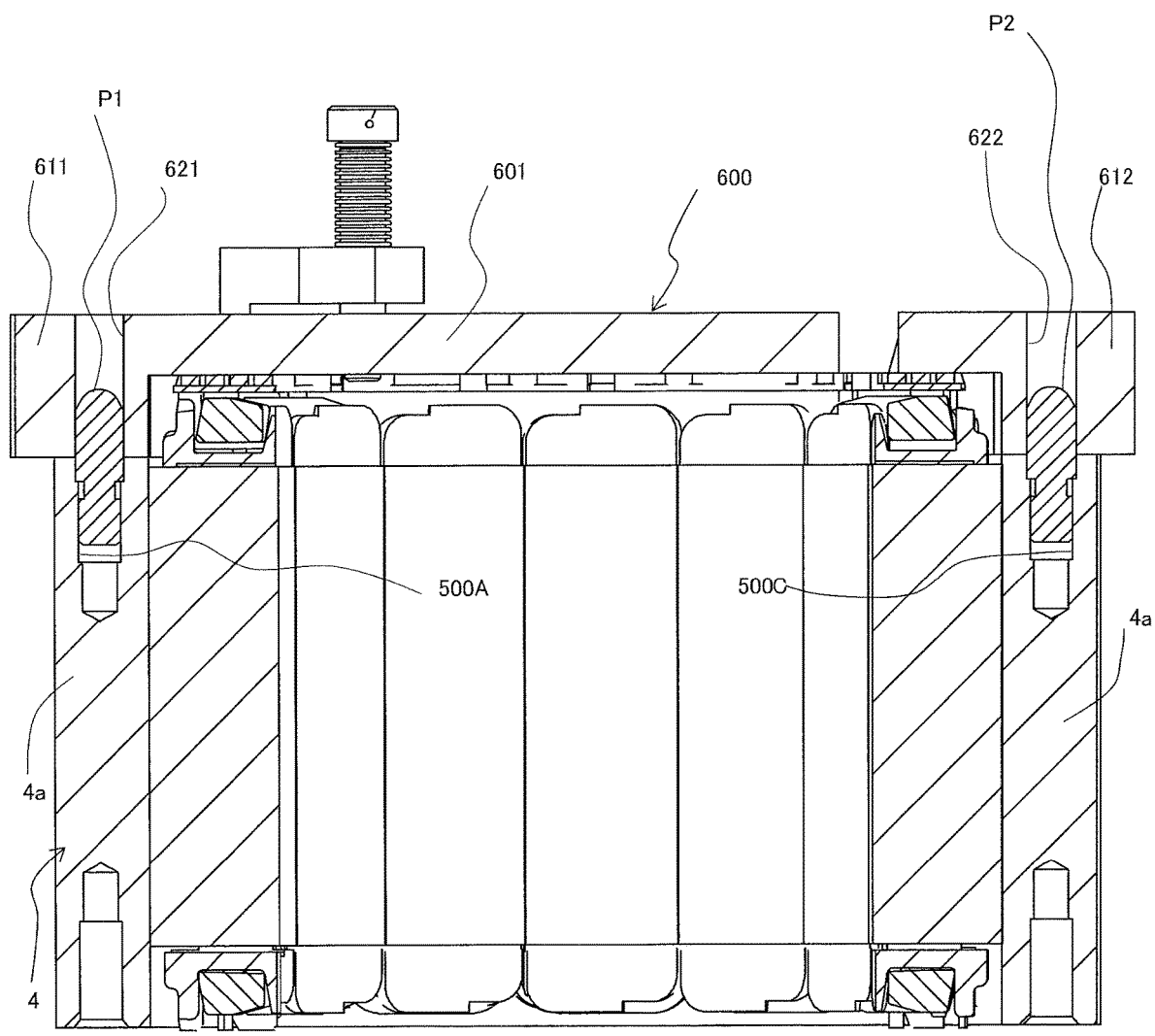
FIG. 14 is a longitudinal cross-sectional view taken along a Y-Y cross-section.

As shown in FIG. 14, the pins P1 and P2 machined with high accuracy are inserted in advance into the reference holes 500A and 500C of the frame 4. Thereafter, the jig 600 is arranged such that the position of the through holes 621, 622 overlap the reference holes 500A and 500C of the frame 4, respectively. As a result, the jig 600 is positioned with high accuracy with respect to the frame 4 in the rotational direction (i.e., circumferential direction, hereinafter the same).

Figure 13:
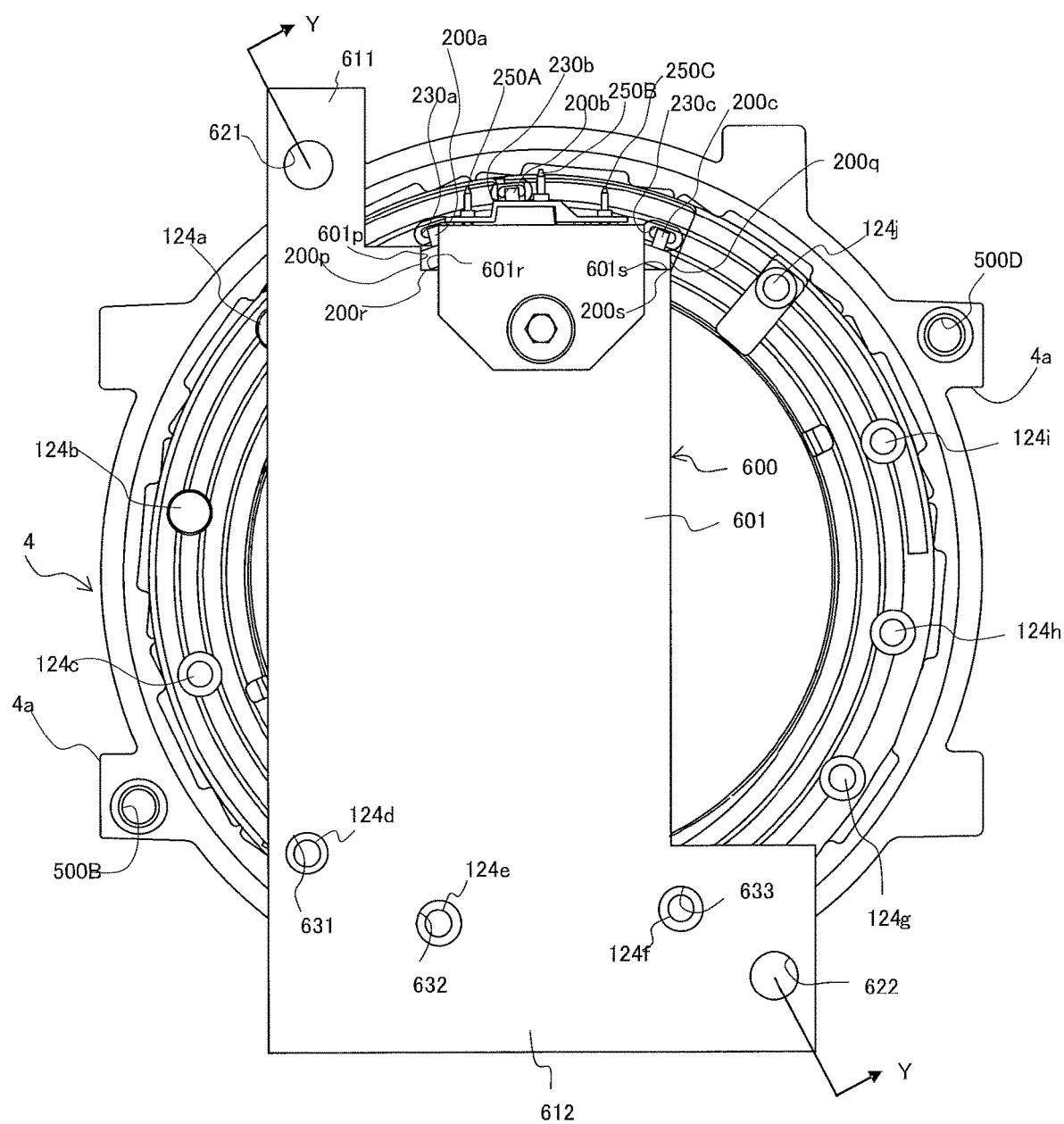
FIG. 13 is a diagram showing the behavior of positioning the connection terminal using a jig, as viewed from the side corresponding to the anti-load side.

Next, in the assembly body in which the connecting board 100 is inserted into the stator 2 assembled in advance, the above-mentioned protruding portions 124d, 124e, 124f protruding from the connecting board 100 are penetrated into the through holes 631, 632, 633 of the jig 600 (see FIG. 13). As a result, the connecting board 100 is positioned relative to the jig 600 in the rotational direction.

The main body 601 includes positioning end portions 601p, 601r and 601s provided so as to be cut in a substantially L shape at the end portion on the one side (upper side in FIG. 13).

In positioning the connection terminal 200, the positioning end portion 601p of the jig 600 is abutted against the positioning end surface 200p of the connection terminal 200, the positioning end portion 601r is abutted against the positioning end surface 200r, and the positioning end portion 601s is abutted against the positioning end surface 200s. As a result, the connection terminal 200 is positioned in the rotational direction with respect to the jig 600. In this state, the support legs 200b are inserted into the support holes 230b of the conductive member 110a of the connecting board 100, and the support legs 200a and 200c are inserted into the support holes 230a and 230c of the conductive member 110b and fixed by solder. In this way, the connecting board 100 and the connection terminal 200 are fixed through the jig 600 in a state in which they are positioned with high accuracy in the rotational direction, and then the jig 600 and the pins P1 and P2 are removed from the frame 4.

<Positioning of Each Part Using the Mold During Resin Molding>

As described above, assembly body of the stator 2 and the connecting board 100 and the connection terminal 200 are integrated with each other in a state of positioning in the rotational direction. Next, the integral body is covered with the resin molding portion 15 to be fixed to the frame 4. At the time of resin molding, axial positioning and rotational positioning of the integral body with respect to the frame 4 are performed using a molding die DI used for resin molding.

<Axial Positioning>

Figure 15:
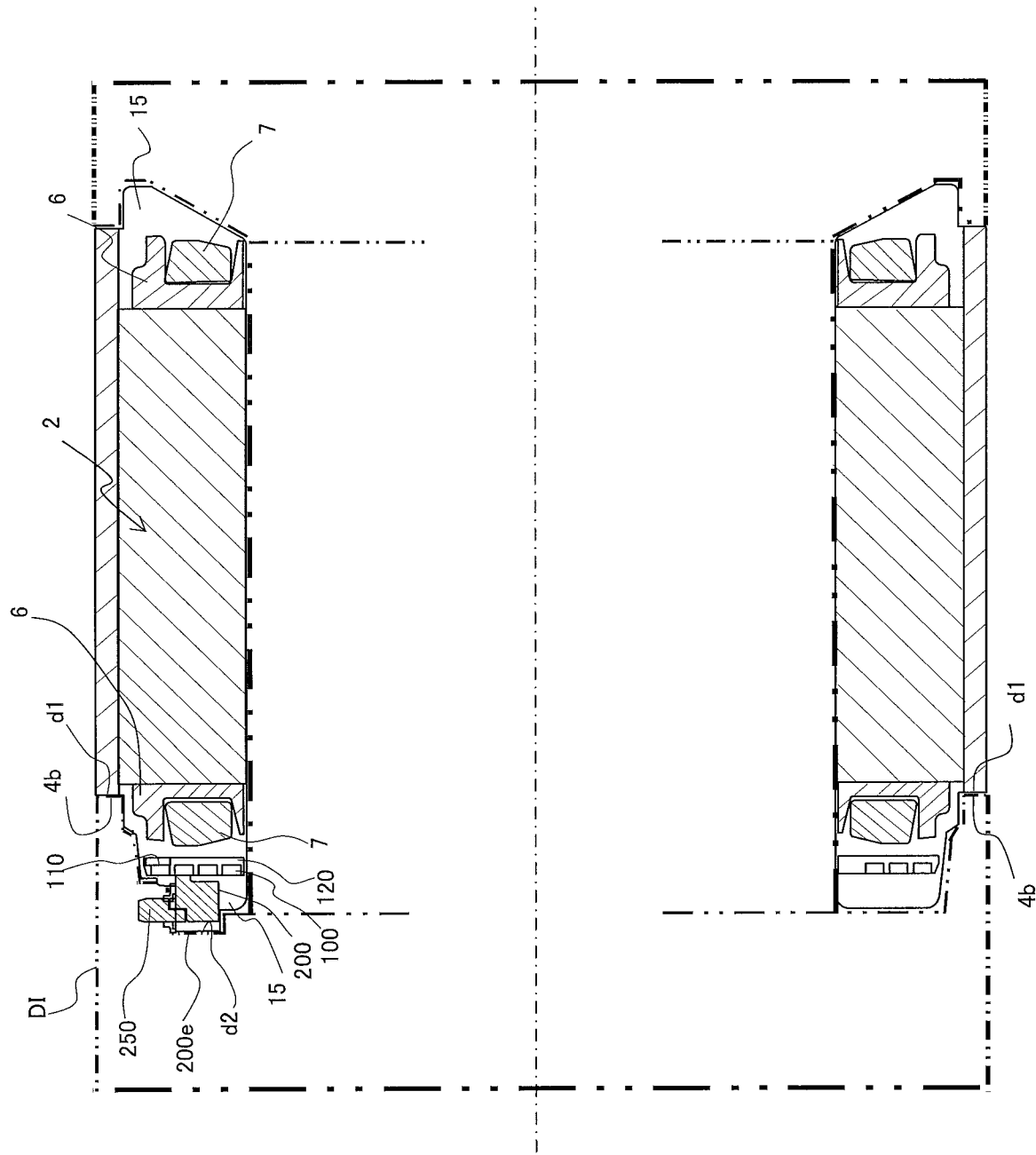
FIG. 15 is a conceptual cross-sectional view for explaining positioning behavior using a mold in resin molding.

As shown schematically in FIG. 15, the molding die DI for molding the resin molding portion 15 has an end surface d1 which abuts against an abutting end surface 4b (an example of a second abutting surface) on the anti-load side of the frame 4 during resin molding. The molding die DI has an end surface d2 which abuts against an abutting end surface 200e (an example of a first abutting face) on the anti-load side of the connection terminal 200 during resin molding. That is, the end surface d2 of the molding die DI abuts against the abutting end surface 200e, so that the end surface positions coincide with each other.

As described above, the abutting end surface 4b of the frame 4 abuts against the end surface d1 of the molding die DI formed with extremely high accuracy, and the abutting end surface 200e of the connection terminal 200 abuts against the end surface d2. As a result, positioning of the frame 4 and the connection terminal 200 in the axial direction is realized.

<Reference Hole of Anti-Load Side Bracket>

On the other hand, as will be described later, in the present embodiment, holes 700A, 700B, 700C, 700D (an example of a positioned hole) for positioning and mounting the anti-load side bracket 13 with respect to the frame 4 are formed in the axial direction of the anti-load side bracket 13 at positions (coaxial positions) corresponding to the reference holes 500A, 500B, 500C, 500D of the frame 4. Hereinafter, these holes 700A to 700D are collectively referred to simply as "holes 700".

The anti-load side bracket 13 is finally fixed to the frame 4 after the resin to bolts 710A, 710B, 710C, 710D (hereinafter refer to simply as "bolts 710") engaged with the holes 700A, 700B, 700C, and 700D are fastened to internal threads formed in the reference holes 500A, 500B, 500C, and 500D, respectively, so that the anti-load side bracket 13 is finally fixed to the frame 4 after the resin molding portion 15 is formed.

<Positioning in Rotation Direction>

Here, the positioning of the integral body of the stator 2 and the connecting board 100 assembly and the connection terminal 200 with respect to the frame 4 in the rotational direction is performed using the reference hole 500 of the frame 4. That is, at the time of resin molding, one positioning pin (an example of a jig, not illustrated) which is machined in advance with high accuracy with respect to any one of the above-mentioned reference holes 500A to 500D of the frame 4 is inserted as a jig for resin molding. This positioning pin includes an end surface (an example of a fourth abutting surface, not illustrated) for abutting against the molding die DI during resin molding.

One of the connection pins 250A, 250B and 250C provided at the connection terminal 200 is provided with an end surface (an example of a third contact surface, not illustrated) for contact which is brought into contact with the molding die DI during resin molding.

The molding die DI has an end surface which abuts against the abutting end surface of the positioning pin during resin molding, and an end surface which abuts against the abutting end surface of the connection pin 250 (not illustrated).

As described above, the positioning pin and the connection pin are abutted against the two end surfaces of the molding die DI formed with extremely high accuracy, so that the positioning of the frame 4 and the connection pin 250 (in other words, the connection terminal 200) in the rotational direction is realized.

<Positioning of Anti-Load Side Bracket>

As described above, with the frame 4 and the connection terminal 200 positioned in the axial direction and the frame 4 and the connection terminal 200 positioned in the rotational direction, the resin molding is performed by a known technique to form the resin molding portion 15. As a result, a mold joint of the frame 4, the stator 2, the connecting board 100, the connection terminal 200, and the connection pin 250, which are positioned with high accuracy in the axial direction and the rotational direction, is formed.

In a state where the mold joint is formed, the bolt 710 engaging with the hole 700 of the anti-load side bracket 13 is fastened to the reference hole 500 of the frame 4 included in the mold joint. As a result, the anti-load side bracket 13 is fixed to the frame 4 and the mold joint in a state of being positioned with high accuracy in the rotational direction. Thereby, the direct connection connector 400 of the connector body CB to be engaged with the opening 13A of the anti-load side bracket 13 can be positioned with high accuracy with respect to the connection terminal 200 and the connection pin 250 provided in the mold joint body.

Effects of the Embodiment

As described above, in the rotary electric machine 1 of the present embodiment, a connection terminal 200 is attached to an end portion of the connecting board 100 on the anti-load side, and a connection pin 250 is provided on the connection terminal 200 so as to project radially outward.

On the other hand, an opening 13A is provided radially outward of the anti-load side bracket 13 fixed to the anti-load side of the frame 4, and the main circuit connector 300 is engaged with the opening 13A. The main circuit connector 300 is provided with a direct connection connector 400 which is electrically connected thereto, and when the main circuit connector 400 is engaged with the opening 13A, the direct connection connector 400 accommodates the connection pin 250 and is electrically connected thereto.

As a result, according to the rotary electric machine 1 of the present embodiment, the connecting board 100 and the main circuit connector 300 can be directly connected to each other without using the lead wire via the path of the connecting board 100, the connection terminal 200, the connection pin 250, the direct connection connector 400, and the main circuit connector 300.

Further, in this embodiment, in particular, when the connecting board 100 and the main circuit connector 300 are directly connected by the conduction of the direct connection connector 400 and the connection pin 250 as described above, the elastic member 270 is sandwiched between the connection terminal 200 from which the connection pin 250 protrudes and the direct connection connector 400. As a result, it is possible to prevent the connection pin 250 from being exposed to the outside of the anti-load side bracket 13 through the gap between the direct connection connector 400 and the connection terminal 200. As a result, the connection pin 250 can be protected from conductive powder, moisture or the like that may exist in the internal space of the rotary electric machine 1.

Further, particularly in the present embodiment, when the direct connection connector 400 and the connection pin 250 are electrically connected, the protruding portions 270a to 270c provided on the elastic member 270 are compressed and deformed between the direct connection connector 400 and the connection terminal 200. Since the deformation at the time of compression spreads so as to be crushed, the gap between the direct connection connector 400 and the connection terminal 200 can be securely filled and sealed, and the invasion of the above-mentioned conductive powder, moisture or the like can be securely prevented.

Further, in the present embodiment, particularly, a plurality of connection pins 250 are provided in step portions 200A to 200c provided in connection terminals 200, respectively. As a result, compared with the case where the plurality of connection pins 250 are provided on one common flat surface provided on the connection terminal 200, the creepage distance between the connection pins 250 can be made relatively large by the difference in level. As a result, a short-circuit or ground fault between the connection pins 250 can be further suppressed.

Further, in this embodiment, in particular, when a plurality of connection pins 250 are provided on the connection terminal 200 as described above, the connection pins 250 are provided in such an arrangement that their installation positions are asymmetrical, that is, not symmetrical, with respect to the circumferential center plane (plane Xb in the above example). As a result, when the connection pin 250 is inserted into the direct connection connector 400 and is electrically connected to each other, the direct connection connector 400 can be smoothly mounted if it is in a correct posture, and on the other hand, the direct connection connector 400 cannot be mounted if it is in a wrong posture in the opposite direction. As a result, it is possible to reliably prevent erroneous mounting in a wrong posture, which may occur in the case of being symmetrical.

Further, in this embodiment, particularly when a plurality of connection pins 250 are provided to the connection terminal 200 as described above, the shape of the installation region of the connection terminal 200 in which the connection pins 250 are provided (the whole shape of the step portions 200A, 200B and 200C in the above example) is asymmetrical, that is, not symmetrical, with respect to the circumferential center plane (plane Xb in the above example). As a result, when the connection pin 250 is inserted into the direct connection connector 400 and is electrically connected to each other, the direct connection connector 400 can be smoothly mounted if it is in a correct posture, and on the other hand, the direct connection connector 400 cannot be mounted if it is in a wrong posture in the opposite direction. As a result, it is possible to reliably prevent erroneous mounting in a wrong posture, which may occur in the case of being symmetrical.

In this embodiment, in particular, the stator 2 and the connecting board 100 are fixed to the frame 4 by the resin molding portion 15. At this time, the molding die DI used for resin molding abuts against both the abutting end face 200$e$ provided on the end surface of the connection terminal 200 on the anti-load side of the connection terminal 200 and the abutting end surface 4$b$ provided on the end surface on the anti-load side of the frame 4. As a result, the connection terminal 200 and the frame 4 are accurately positioned in the axial direction through the molding die DI, so that the main circuit connector 300 fixed to the direct connection connector 400 conducting to the connection pin 250 of the connection terminal 200 can be accurately positioned in the axial direction with respect to the electromagnetic parts such as the stator 2 and the rotor 3 in the frame 4. As a result, the assembly process of the above-described structure in which the connecting board 100 and the main circuit connector 300 are directly connected can be automated relatively easily.

In this embodiment, in particular, the frame 4 is provided with a reference hole 500 serving as a positioning reference, and is provided with a hole 700 for positioning the anti-load side bracket 13 at the same axial center position as the reference hole 500. Thus, by positioning the hole 700 of the anti-load side bracket 13 at the same axial center position as the reference hole 500 of the frame 4, the anti-load side bracket 13 can be positioned in the circumferential direction with respect to the frame 4.

In this embodiment, in particular, the stator 2 and the connecting board 100 are fixed to the frame 4 by the resin molding portion 15. At this time, the molding die DI used for resin molding abuts against both the abutting end surface (third abutting surface) provided on the connection pin 250 and the abutting end surface (fourth abutting surface) provided on the positioning pin inserted into the reference hole 500 of the frame 4. As a result, the connection pin 250 and the reference hole 500 are accurately positioned in the circumferential direction through the molding die DI. On the other hand, as described above, since the anti-load side bracket 13 and the frame 4 are also positioned with high accuracy in the circumferential direction with respect to the reference hole 500, the connection pin 250, the frame 4 and the anti-load side bracket 13 can be positioned with high accuracy in the circumferential direction with respect to each other. Therefore, it is possible to accurately position the main circuit connector 300 fixed to the direct connection connector 400 into which the connection pin 250 is inserted at the opening 13A of the anti-load side bracket 13 with respect to the electromagnetic parts such as the stator 2 and the rotor 3 in the frame 4 in the circumferential direction. As a result, the assembly process of the above-described structure in which the connecting board 100 and the main circuit connector 300 are directly connected can be automated relatively easily.

Other Modifications

It should be noted that in the above description, when "vertical", "parallel", "plane" or the like is described, the description does not have a strict meaning. That is, the terms "vertical", "parallel", and "plane" mean "substantially vertical", "substantially parallel", and "substantially plane" in which design and manufacturing tolerances and errors are allowed.

Further, in the above description, when there are descriptions such as "same", "equal", and "different" in dimensions and sizes on appearance, the descriptions do not have a strict meaning. In other words, "same", "equal", and "different" mean "substantially same", "substantially equal", and "substantially different", in which tolerances and errors in design and manufacturing are allowed.

In addition to the above-described methods, methods according to the above-described embodiments and modifications may be used in combination.

In addition, although each example is not given, the above-described embodiments and the like are implemented with various modifications within a range not deviating from the purpose thereof.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A rotary electric machine comprising:
   a rotor rotatable around an axis;
   a stator provided to surround the rotor around the axis and including stator windings, the stator having a first side on one side and a second side opposite to the first side along the axis;
   a connecting board which is provided on the one side and to which the stator windings are electrically connected;
   a bracket having an opening and provided on the one side to be connected to the stator so as to cover the connecting board and the first side of the stator;
   connection pins electrically connected to the connecting board;
   a direct connection connector which is inserted into the opening of the bracket such that the connection pins are inserted into the direct connection connector to be electrically connected to the direct connection connector; and
   a main circuit connector inserted into the opening to be engaged with the bracket and to be electrically connected to the direct connection connector.

2. The rotary electric machine according to claim 1, further comprising:
   an elastic member which is sandwiched between the direct connection connector and the connection terminal in a state in which the connection pin is inserted into the direct connection connector.

3. The rotary electric machine according to claim 2, wherein the elastic member comprises
   a through hole through which the connection pin passes, and
   a protruding portion projecting outward in a radial direction of the through hole and compressed and deformed between the direct connection connector and the connection terminal when the direct connection connector and the connection pin are electrically connected.

4. The rotary electric machine according to claim 1, wherein the connection terminal includes a plurality of step portions to form a concave and convex shape corresponding to the direct connection connector, and
   wherein the connection pins are provided in the step portions, respectively.

5. The rotary electric machine according to claim 1, wherein installation positions of the connection pins in the connection terminal are asymmetric between one side and another side opposite to the one side with respect to the center plane in a circumferential direction.

6. The rotary electric machine according to claim 1, wherein an installation region of the connection pins in the connection terminal is configured to be an asymmetrical shape between one side of the center plane and the other side thereof with respect to the center plane in the circumferential direction.

7. The rotary electric machine according to claim 1, wherein a position in the axial direction of a radial center line of the direct connection connector and the position in the axial direction of the radial center line of each of the plurality of connection pins are offset from each other along the axial direction.

8. The rotary electric machine according to claim 1,
   wherein the stator and the connecting board are fixed to the frame by resin molding, and
   wherein the connection terminal and the frame are provided with a first abutting surface and a second abutting surface against which a molding die used in the resin molding is abutted, on one end surface in the axial direction respectively.

9. The rotary electric machine according to claim 8,
   wherein the frame includes a reference hole serving as a positioning reference, and
   wherein the bracket has a positioning hole positioned at the same axial center position as the reference hole.

10. The rotary electric machine according to claim 9,
    wherein the connection pin and the predetermined jig inserted into the reference hole include a third abutting surface and a fourth abutting surface against which a molding die used in the resin molding is abutted, respectively.

11. The rotary electric machine according to claim 1, further comprising:
    a connection terminal provided to be electrically connected to the connecting board such that the connecting board is provided between the connection terminal and the first side of the stator, the connection pins being provided on the connection terminal to be electrically connected to the connection terminal and to project from the connection terminal.

12. The rotary electric machine according to claim 1, further comprising:
    a frame provided to surround the stator around the axis, an outer peripheral surface of the stator being connected to an outer peripheral surface of the frame.

13. The rotary electric machine according to claim 12, wherein the connecting board is connected to the frame.

14. The rotary electric machine according to claim 12, wherein the bracket is connected to the stator via the frame.

15. The rotary electric machine according to claim 1, wherein the opening of the bracket extends toward the axis along a passing through direction substantially a radial direction of the rotor.

16. The rotary electric machine according to claim 15, wherein the connection pins project along the passing through direction.

17. The rotary electric machine according to claim 1, wherein the stator windings are wired in a predetermined wiring pattern via the connecting board.

* * * * *